No. 740,163. PATENTED SEPT. 29, 1903.
G. F. MOORE.
GAS REGULATOR FOR BURNERS.
APPLICATION FILED MAR. 30, 1903.
NO MODEL.
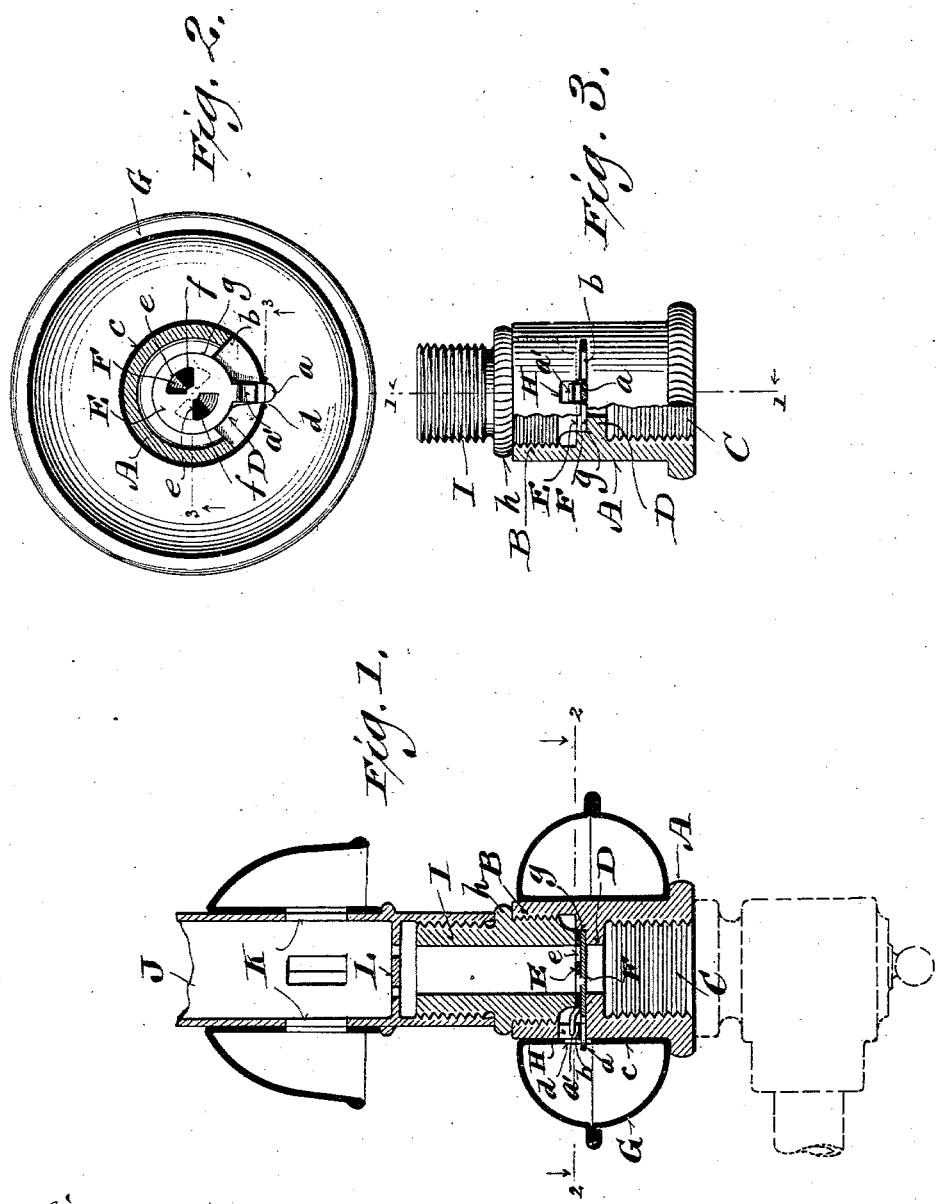
Witnesses:
Geo. W. Young,
Morris Berry.
Inventor:
George F. Moore,
By Livingston A. Thompson
Attorney No. 740,163.

Patented September 29, 1903.

UNITED STATES PATENT OFFICE.

GEORGE F. MOORE, OF MILWAUKEE, WISCONSIN.

GAS-REGULATOR FOR BURNERS.

SPECIFICATION forming part of Letters Patent No. 740,163, dated September 29, 1903.

Application filed March 30, 1903. Serial No. 150,177. (No model.)

*To all whom it may concern:*

Be it known that I, GEORGE F. MOORE, a citizen of the United States, and a resident of Milwaukee, in the county of Milwaukee and State of Wisconsin, have invented certain new and useful Improvements in Gas-Regulators for Burners; and I do hereby declare that the following is a full, clear, and exact description thereof.

My invention has for its object to provide a simple and effective gas-regulator for burners and is adapted to be interposed between the discharge of a gas-bracket and the burner, and it is especially designed to be used in connection with incandescent gas-burners—such, for instance, as patented by Wm. Trice, May 25, 1897, No. 583,344—where the flow of gas is determined by the size of holes in the tip. These holes when of less area than is required to make a perfect light consistent with the gas-pressure are enlarged to suit the condition, and when the gas-pressure increases it will be seen that the holes are too great in area, and consequently the burner is then rendered useless. Under these conditions by attaching one of my devices to the aforesaid burner it regulates the supply of gas to the required amount and for all practical purposes makes the said burner as effective as a new one.

A further object of my invention is to provide a regulator for the ordinary gas-burner where the tips are unnecessarily large for lighting public halls, &c.; and it consists in certain peculiarities of construction and combination of parts to be fully set forth hereinafter with reference to the accompanying drawings, and subsequently claimed.

In the drawings, Figure 1 is a vertical section of my device indicated on line 11 of Fig. 3, with a portion of an incandescent burner in place. Fig. 2 is a plan sectional view on the line 2 2 of Fig. 1; and Fig. 3 is a detail elevation of the same partly broken away and in section on the line 3 3 of Fig. 2.

Referring by letters to the drawings, A indicates a thimble which is internally threaded at B C and has a central shoulder D. The latter is bored out to form a gas-passage and its upper face is countersunk at $g$ for the reception of a pair of disks E F, which together form a valve and seat, the lower disk F of which has a handle $a$ projecting through a horizontal slot $b$ in the thimble A for engagement with a hollow spool G. This latter is provided with a central sleeve $c$, which turns upon the periphery of the aforesaid thimble and has an aperture $d$, through which the handle $a$ of disk F protrudes.

The upper disk E rests upon the face of the lower disk and has a tongue A', which is slightly bent for engagement with a vertical offset H of the slot $b$, and both disks, as best shown in Fig. 2 of the drawings, are provided with radial openings $e f$, respectively.

A threaded hollow plug I is fitted into the upper end of the thimble A, having its lower end faced and resting upon the disk E, so as to hold the latter, together with disk E, into the countersunk seat $g$. A shoulder of said plug rests upon the upper face of the thimble and prevents the former from cramping the disks upon their seat.

The upper portion of plug I is threaded to receive the gas-burner and, as illustrated in Fig. 1 of the drawings, is fitted with an incandescent burner-tube $j$ with a regulator-opening K. A partition L below the same is provided with the usual orifices through which the gas is fed to the burner.

From the above description of the several parts it is obvious that by turning the thimble the flow of gas can be regulated or cut off entirely by means of the lower disk F being turned to open or close the radial openings in the upper disk E, which is held stationary by reason of the tongue $a'$ entering the recess H, and to prevent any escape of gas the spool is made air-tight, so that should any escape through the horizontal slot $b$ it is confined within the said spool.

To assemble the parts, (the plug I being removed,) the spool is first slipped on and the disks are then dropped into their seat in their order, the offset H of slot $b$ performing a double function—namely, to permit the handle $a$ of disk F being inserted into the thimble A and also to hold the tongue $a'$ of disk E from turning. The plug I is then screwed home and the device is ready for use, thus doing away with pivot-pins for the valve or other complication which would be expensive to construct and when used liable to get out of order.

Having thus described my invention, what I claim as new, and desire to secure by Letters Patent, is—

1. In a gas-regulator for burners an internally-threaded thimble having a central shoulder, a pair of disks, having openings therein resting upon said shoulder, a horizontal slot provided with a vertical offset in the thimble, a handle projecting from the lower disk through the horizontal slot and a tongue projecting from the upper disk and into the aforesaid vertical offset, a hollow spool having a central sleeve fitted upon said thimble and an aperture in the sleeve for engagement with the aforesaid disk-handle, and hollow threaded plug fitted into the thimble above the shoulder whereby the disks are held in place, substantially as set forth.

2. In a gas-regulator for burners an internally-threaded thimble having a shoulder therein and a horizontal slot, valve-disks having openings therein resting upon the shoulder, a hollow plug fitted into the thimble, whereby said disks are held in place, a handle projecting from one of said disks and through the aforesaid slot, means for holding the other disk against vertical movement and a spool fitted upon the exterior of the thimble for engagement with the said disk-handle, substantially as set forth.

In testimony that I claim the foregoing I have hereunto set my hand, at Milwaukee, in the county of Milwaukee and State of Wisconsin, in the presence of two witnesses.

GEORGE F. MOORE.

Witnesses:
FRANK C. COURTENAY,
GEO. W. YOUNG.